A. GRANVILLE.
Hydraulic-Elevators.
No. 157,126. Patented Nov. 24, 1874.
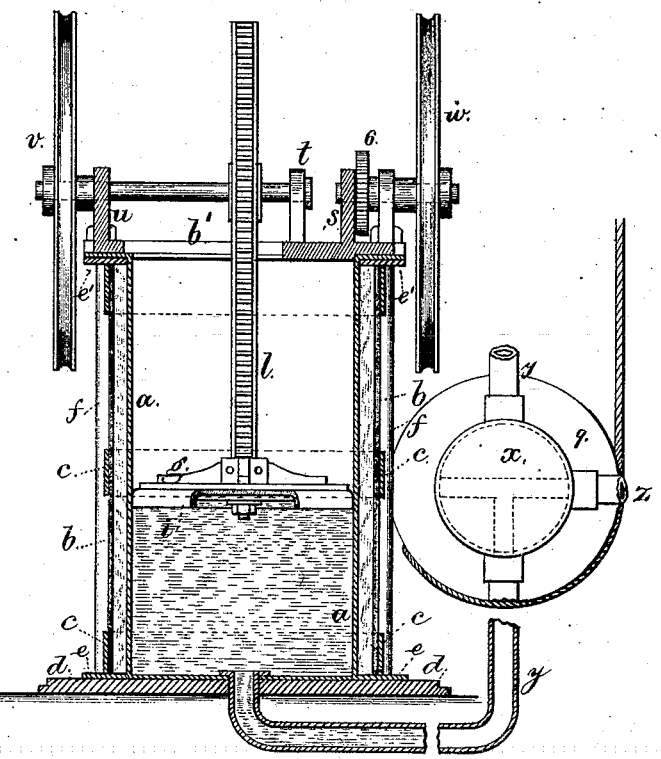
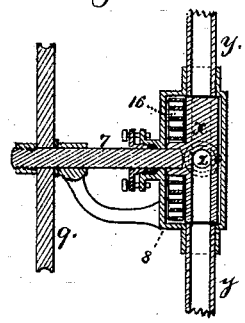
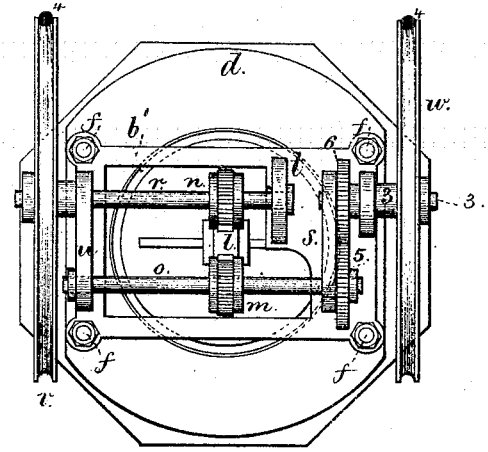
Witnesses
Chas. H. Smith
Geo. T. Pinckney
Inventor
Arthur Granville
per L. W. Serrell
Atty.

UNITED STATES PATENT OFFICE.

ARTHUR GRANVILLE, OF NEW YORK, N. Y.

IMPROVEMENT IN HYDRAULIC ELEVATORS.

Specification forming part of Letters Patent No. 157,126, dated November 24, 1874; application filed September 2, 1874.

*To all whom it may concern:*

Be it known that I, ARTHUR GRANVILLE, of the city and State of New York, have invented an Improvement in Hydraulic Elevators, of which the following is a specification:

This elevator is made in such a manner as to balance the forces and prevent undue strain or friction in any part.

In the drawing, Figure 1 is a vertical section, and Fig. 2 is a plan, of the said elevator.

The cylinder $a$ is made of sheet metal, preferably planished copper, bent up to a correct cylindrical shape upon a core, and the edges joined with a lap-plate and solder. The size of this cylinder is to be proportioned to the work to be performed and the pressure of water that is available for operating the elevator. The cylinder is stiffened, supported, and strengthened by a surrounding layer of a composition formed of about one and a quarter parts of good rag paper-pulp, one part animal size, and three-quarters of one part of china-clay or plaster-of-paris, beaten up into a semi-fluid homogeneous mass. After the cylinder is coated with this material, it is dried either in the atmosphere or under a gentle heat, and shrinks tightly upon the cylinder, forming a very strong and light casing, and I surround it with staves $b$ and bands $c$, as shown. Portland cement or similar material may take the place of the paper-pulp. This cylinder is cheap and not liable to corrosion. This cylinder rests upon a bed plate or block, $d$, and a ring-flange, $e$, is secured to the bed-block $d$ by the tie-rods $f$, that are preferably of steel; and they are provided with shoulders, that support the ring $e'$ beneath the upper flange of the copper cylinder $a$. The piston $g$ is provided with a cup-leather, $i$, and the rod $l$ has teeth on opposite sides, forming a double rack, that gears into the pinions $m$ $n$ upon the shafts $o$ $r$, that are supported in bearings or journal-boxes $s$, $t$, and $u$ upon the ring or top plate $b'$ of the cylinder $a$. The pinions $m$ $n$ and racks $l$ have bearing-surfaces at the pitch-line, so as to prevent strain or undue friction from the teeth passing to the bottoms of the intermediate spaces. The wheels $v$ and $w$ have attached to them the wire or other ropes 4, passing to the car or platform to be raised; but the same is not shown, because it may be of any desired character, and forms no part of my invention. If these wheels $v$ $w$ were both on either the shaft $o$ or the shaft $r$, the pinion $m$ or $n$ would take almost all the strain, and the teeth would require to be large and heavy. To insure greater uniformity in the distribution of the strain, and to avoid as much as possible the friction, I place one wheel, $v$, upon the end of the shaft $r$, and the other wheel, $w$, upon a separate shaft, 3, in line therewith, but separate from the shaft $r$, and connect the shafts $o$ and 3 by the corresponding gears 5 and 6, so that the piston and rod will be guided, and the power will be taken equally from both edges of the piston-rod. The use of guides or guide-rollers is rendered unnecessary by my improvement, and the piston and rod are guided, and the movement is rectilinear and vertical, and the pressure is equalized upon all the teeth of the rack and gearing. The use of two wheels and ropes lessens the risk of accident, because either rope would be sufficient, under ordinary circumstances, to sustain the car or platform if the other rope were injured.

Water under pressure passes through the pipe $y$ and stop-cock $x$ to the cylinder $a$, and this stop-cock $x$ is made with three passage-ways, as represented in Figs. 1 and 3, and a spring, 16, is connected at one end to the spindle 7, and at the other end to the case 8; and upon the spindle 7 there is a band-wheel, 9, from which a rope passes up through the elevator, and over a pulley, and a weight is provided at the end, which is just sufficient to counteract the spring 16, so that the attendant can start the elevator by a pull on the rope, allowing the spring to turn the plug of the cock, and open the channel from the supply-pipe; or by a movement of the rope in the other direction the supply will be shut off, and by a still further movement the plug brings the ports into the position for the water to pass out of the cylinder $a$, through the three way-cock, into the discharge-pipe $z$, as the elevator descends. The piston $g$ is, by preference, made of cast-steel, with radial ribs, and a socket for the toothed piston-rod, and the cup-leather packing is secured by a clamping-plate, so that the piston is very tight, light, and not liable to wear or injure the cylinder.

If desired, the spring 16 may be omitted and a weight substituted, the same being hung to a cord or rope passing over the pulley 9, and hanging below the same. The shafts $r$ and 3, being on the same line and revolving at uniform speed, might be united in one shaft; but I prefer to have them disconnected, as shown, to insure greater uniformity of strain upon the respective teeth and wheels.

I claim as my invention—

1. The pinions $n\ m$ and shafts $r\ 3$, arranged on opposite sides of the toothed piston-rod, in combination with the gear-wheels 5 6, and wheels $v$ and $w$ for the ropes of the elevator, substantially as set forth.

2. The hydraulic cylinder $a$, with a plate, $b'$, secured to the open end by tie-rods $f$ passing to the base, which plate also carries the shafts of the two wheels $v\ w$, that receive the ropes to an elevator, in combination with the double gearing connecting the piston-rod racks $l$ with the shafts of the wheels $v\ w$, for the purposes and substantially as set forth.

Signed by me this 31st day of August, A. D. 1874.

ARTHUR GRANVILLE.

Witnesses:
GEO. T. PINCKNEY,
CHAS. H. SMITH.